United States Patent
Yang et al.

(10) Patent No.: US 11,531,859 B2
(45) Date of Patent: Dec. 20, 2022

(54) SYSTEM AND METHOD FOR HASHED COMPRESSED WEIGHTING MATRIX IN NEURAL NETWORKS

(71) Applicant: Samsung Electronics, Co. Ltd., Suwon si (KR)

(72) Inventors: Duanduan Yang, San Jose, CA (US); Xiang Sun, Campbell, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1096 days.

(21) Appl. No.: 15/853,431

(22) Filed: Dec. 22, 2017

(65) Prior Publication Data

US 2019/0050709 A1 Feb. 14, 2019

Related U.S. Application Data

(60) Provisional application No. 62/542,636, filed on Aug. 8, 2017.

(51) Int. Cl.
*G06N 3/02* (2006.01)
*G06K 9/62* (2022.01)
(Continued)

(52) U.S. Cl.
CPC ............ *G06N 3/02* (2013.01); *G06F 16/9014* (2019.01); *G06F 17/16* (2013.01); *G06K 9/627* (2013.01); *G06K 9/6218* (2013.01); *G06K 9/6247* (2013.01); *G06K 9/6272* (2013.01); *G06N 3/088* (2013.01); *G06V 10/464* (2022.01)

(58) Field of Classification Search
CPC .......... G06K 9/6272; G06K 9/62; G06N 3/02; G06F 17/16; G06F 16/901; G06F 16/9014
See application file for complete search history.

(56) References Cited

U.S. PATENT DOCUMENTS 3,428,935 A1 4/2013 Waelti et al.
9,054,876 B1 * 6/2015 Yagnik ................ G06F 16/219
(Continued)

FOREIGN PATENT DOCUMENTS

WO 2016134183 A1 8/2016

OTHER PUBLICATIONS

Wu et al "Quantized Convolutional Neural Networks for Mobile Devices", 2016 IEEE Conference on Computer Vision and Pattern Recognition (CVPR) vol. 1, pp. 4820-4228 (Year: 2016).*
(Continued)

*Primary Examiner* — Li Wu Chang

(57) ABSTRACT

A method for a neural network includes receiving an input from a vector of inputs, determining a table index based on the input, and retrieving a hash table from a plurality of hash tables, wherein the hash table corresponds to the table index. The method also includes determining an entry index of the hash table based on an index matrix, wherein the index matrix includes one or more index values, and each of the one or more index values corresponds to a vector in the hash table and determining an entry value in the hash table corresponding to the entry index. The method also includes determining a value index, wherein the vector in the hash table includes one or more entry values, and wherein the value index corresponds to one of the one or more entry values in the vector and determining a layer response.

30 Claims, 10 Drawing Sheets

(51) Int. Cl.
*G06N 3/08* (2006.01)
*G06V 10/46* (2022.01)
*G06F 16/901* (2019.01)
*G06F 17/16* (2006.01)

(56) References Cited

U.S. PATENT DOCUMENTS

| | | | |
|---|---|---|---|
| 9,514,753 | B2 | 12/2016 | Sharifi et al. |
| 9,639,278 | B2* | 5/2017 | Kimmel ............... G06F 3/0611 |
| 9,721,190 | B2 | 8/2017 | Vijayanarasimhan et al. |
| 2006/0095521 | A1 | 5/2006 | Patinkin |
| 2007/0098150 | A1 | 5/2007 | Lauter et al. |
| 2011/0262033 | A1* | 10/2011 | Huo ..................... G06K 9/6221 |
| | | | 382/161 |
| 2012/0054161 | A1 | 3/2012 | Fusco et al. |
| 2016/0062979 | A1 | 3/2016 | Mote et al. |
| 2016/0180200 | A1 | 6/2016 | Vijayanarasimhan et al. |
| 2019/0028723 | A1* | 1/2019 | Swaminathan ........ H04N 19/94 |

OTHER PUBLICATIONS

Alcantara et al, Real-time parallel hashing on the GPU, ACM Siggrpah Asia 2009 (Year: 2009).*
Wang et al "Learning to Hash for Indexing Big Data—A Survey", Proceedings of the IEEE, 2015 (Year: 2015).*
Wang et al., "A Survey on Learning to Hash", Journal of Latex Class Files, vol. 13, No. 9, May 2015, 22 pages.
Zhang et al., "Bit-Scalable Deep Hashing With Regularized Similarity Learning for Image Retrieval and Person Re-Identification", IEEE Transactions on Image Processing, vol. 24, No. 12, Dec. 1, 2015, 14 pages.
Wang et al., "Learning to Hash for Indexing Big Data—A Survey", Proceedings of the IEEE, vol. 104, No. 1, Jan. 1, 2016, 24 pages.
Nu et al., "Quantized Convolutional Neural Networks for Mobile Devices", 2016 IEEE Conference on Computer Vision and Pattern Recognition, Jun. 27, 2016, 9 pages.
Supplementary European Search Report dated Jun. 12, 2020 in connection with European Patent Application No. 18 84 4476, 11 pages.
ISA/KR, "International Search Report and Written Opinion of the International Searching Authority," International Application No. PCT/KR2018/009018, dated Nov. 15, 2018, 10 pages.

* cited by examiner

SYSTEM AND METHOD FOR HASHED COMPRESSED WEIGHTING MATRIX IN NEURAL NETWORKS

CROSS-REFERENCE TO RELATED APPLICATION AND CLAIM OF PRIORITY

This application claims priority under 35 U.S.C. § 119(e) to U.S. Provisional Patent Application No. 62/542,636 filed on Aug. 8, 2017, and entitled "SYSTEM AND METHOD FOR NEURAL NETWORKS." The above-identified provisional patent application is hereby incorporated by reference in its entirety.

TECHNICAL FIELD

This disclosure relates generally to neural networks. More specifically, this disclosure relates to a system and method for approximating a layer response in a neural network using a codebook and hash tables.

BACKGROUND

Neural networks are increasingly used to perform various processes such as image recognition, data analysis, natural language processing, intent classification, or other processes. However, neural networks often require heavy use of computing resources such as storage capacity or processing power, especially as more layers are included in the neural network.

SUMMARY

This disclosure provides a system and method for neural networks.

In a first embodiment, a method for a neural network is provided. The method includes generating a codebook from a weighting matrix of the neural network. The method also includes building an index matrix from the codebook, wherein the index matrix includes one or more index values, and each of the one or more index values corresponds to a location in the codebook. The method also includes generating a hash table for each input of a plurality of inputs.

In a second embodiment, an electronic device is provided. The electronic device includes a communication interface and a memory. The electronic device also includes at least one processor coupled to the communication interface and the memory. The at least one processor is configured to generate a codebook from a weighting matrix of the neural network. The at least one processor is also configured to build an index matrix from the codebook, wherein the index matrix includes one or more index values, and each of the one or more index values corresponds to a location in the codebook. The at least one processor is also configured to generate a hash table for each input of a plurality of inputs.

In a third embodiment, a non-transitory computer readable medium embodying a computer program is provided. The computer program includes computer readable program code that, when executed by at least one processor, causes the at least one processor to generate a codebook from a weighting matrix of the neural network, build an index matrix from the codebook, wherein the index matrix includes one or more index values, and each of the one or more index values corresponds to a location in the codebook, and generate a hash table for each input of a plurality of inputs.

In a fourth embodiment, a method for a neural network is provided. The method includes receiving an input from a vector of inputs. The method also includes determining a table index based on the input. The method also includes retrieving a hash table from a plurality of hash tables, wherein the hash table corresponds to the table index.

In a fifth embodiment, an electronic device is provided. The electronic device includes a communication interface and a memory. The electronic device also includes at least one processor coupled to the communication interface and the memory. The at least one processor configured to receive an input from a vector of inputs. The at least one processor is also configured to determine a table index based on the input. The at least one processor is also configured to retrieve a hash table from a plurality of hash tables, wherein the hash table corresponds to the table index.

In a sixth embodiment, a non-transitory computer readable medium embodying a computer program is provided. The computer program includes computer readable program code that, when executed by at least one processor, causes the at least one processor to receive an input from a vector of inputs, determine a table index based on the input, and retrieve a hash table from a plurality of hash tables, wherein the hash table corresponds to the table index.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

According to embodiments of the present disclosure, various methods for improving the efficiency of neural networks are provided. Deep neural networks can perform various functions such as image recognition, data analysis, natural language processing, intent classification, or other functions. Virtual assistants that receive voice data from a user and activate a program function based on the voice data, such as performing a web search requested orally by the user, also can use a neural network to process the voice data. The virtual assistant can use a neural network to determine an application on a user device to which the utterance is directed. The virtual assistant can then use a neural network to determine a function or the application to which the utterance is directed. The function within that application can then be triggered. This is but one example of how deep neural networks can be used.

Neural networks can generate an output based on a weighted sum of inputs, which is then passed through an activation function. The activation function can determine an output after summing the inputs multiplied by the weights. It will be understood by those skilled in the art that various activation functions can be used depending on the configuration of the neural network and the result to be achieved by the neural network.

The inputs, weights, and outputs can be organized within a multilayer perceptron (MLP), wherein there is an input layer, one or more hidden layers, and an output layer. A plurality of inputs, or an input vector, make up the input layer, a plurality of hidden layer neurons reside in the hidden layer or layers, and one or more outputs can be generated for the output layer. The neural network can be a feedforward network where inputs are passed from the input layer to a hidden layer. The inputs can be processed through an activation or transfer function to provide new inputs to a next hidden layer, if the neural network has multiple hidden layers, from hidden layer to hidden layer until the final hidden layer passes the final outputs to the output layer. A weighting matrix can be between any adjacent layers in a neural network. Weighting matrices are used to apply weights to the inputs that are fed into the neural network. As a neural network is trained, the weights can be adjusted based on calculated error rates to increase the accuracy of the neural network. It will be appreciated that feedforward neural networks are but one type of neural network, and the present disclosure is not limited to only feedforward networks.

Figure 1:
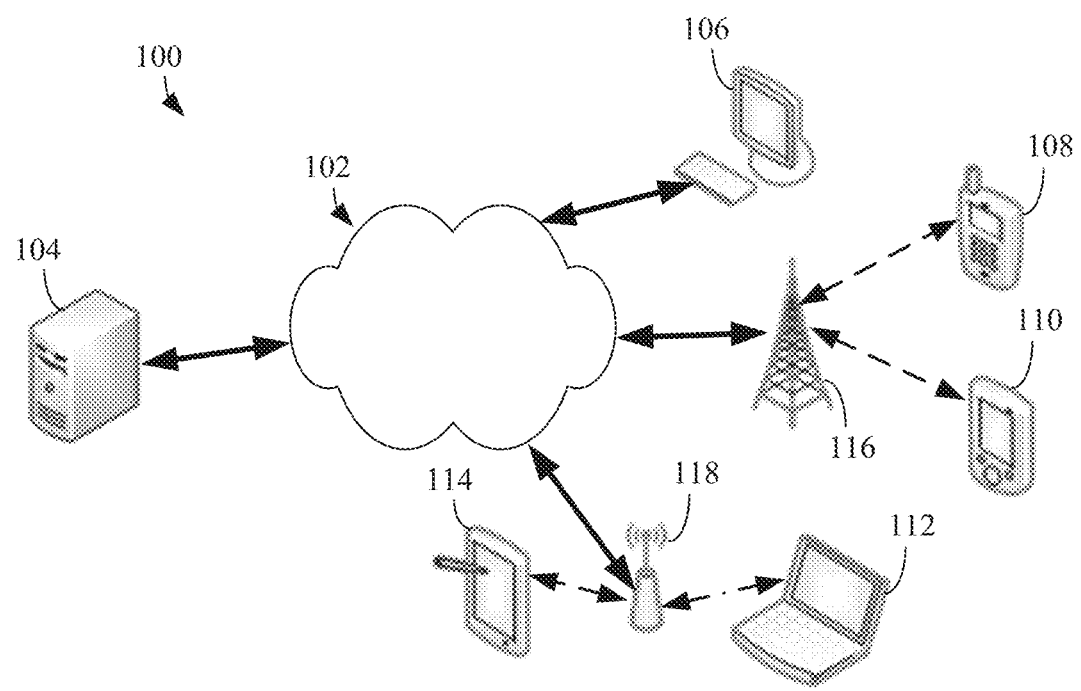
FIG. 1 illustrates an example communication system in accordance with embodiments of the present disclosure.

FIG. 1 illustrates an example system 100 according to this disclosure. The embodiment of the system 100 shown in FIG. 1 is for illustration only. Other embodiments of the system 100 could be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Mobile devices 108 includes both smart phones and feature phones. Smart phones represent a class of mobile devices 108 that are a handheld device with a mobile operating system and an integrated mobile broadband cellular network connection for voice, short message service (SMS), and internet data communication. Feature phones represent a class of mobile devices 108 that are a midway point between a basic phone and a smart phone. Feature phones generally have voice calling and text messaging functions in addition to basic multimedia and internet capabilities. Also, the client devices 112 and 114 (laptop computer and tablet computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) can transmit information securely and efficiently to another device, such as, for example, the server 104. The mobile device 108 (or any other client device 106-114) can receive information to be processed as an input(s) into a neural network. Such information can include image data, voice/audio data, geolocation data, user information, or other data received by or stored on the mobile device 108. The mobile device 108 (or any other client device 106-114) can trigger the information transmission between itself and server 104. The mobile device 108 (or any other client device 106-114) can provide a real-time result generated by a neural network.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide a result processed by a neural network. In certain embodiments, a client device (client device 106-114) can determine the neural network result. In certain embodiments, a client device (client device 106-114) receives the data to be included as inputs into a neural network and transmits the data over the network 102 to the server 104 that determines the output(s) using the neural network.

Figure 2:
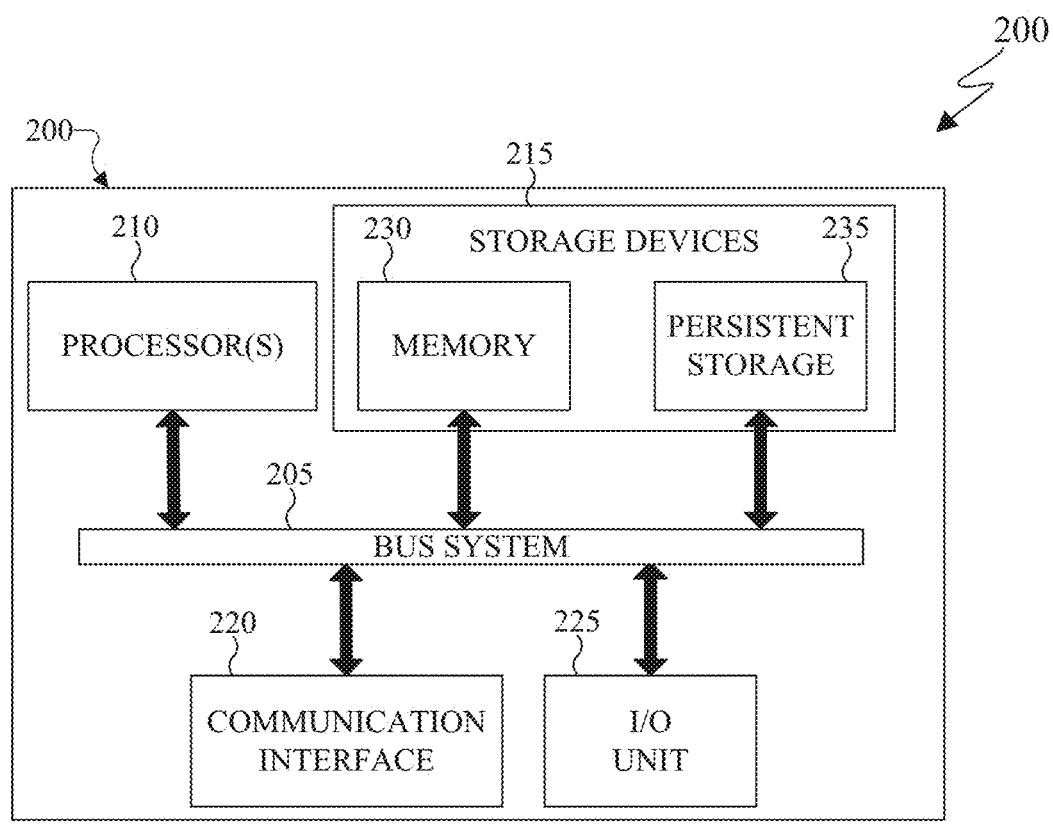
FIG. 2 illustrates an example electronic device server in accordance with embodiments of the present disclosure.
Figure 3:
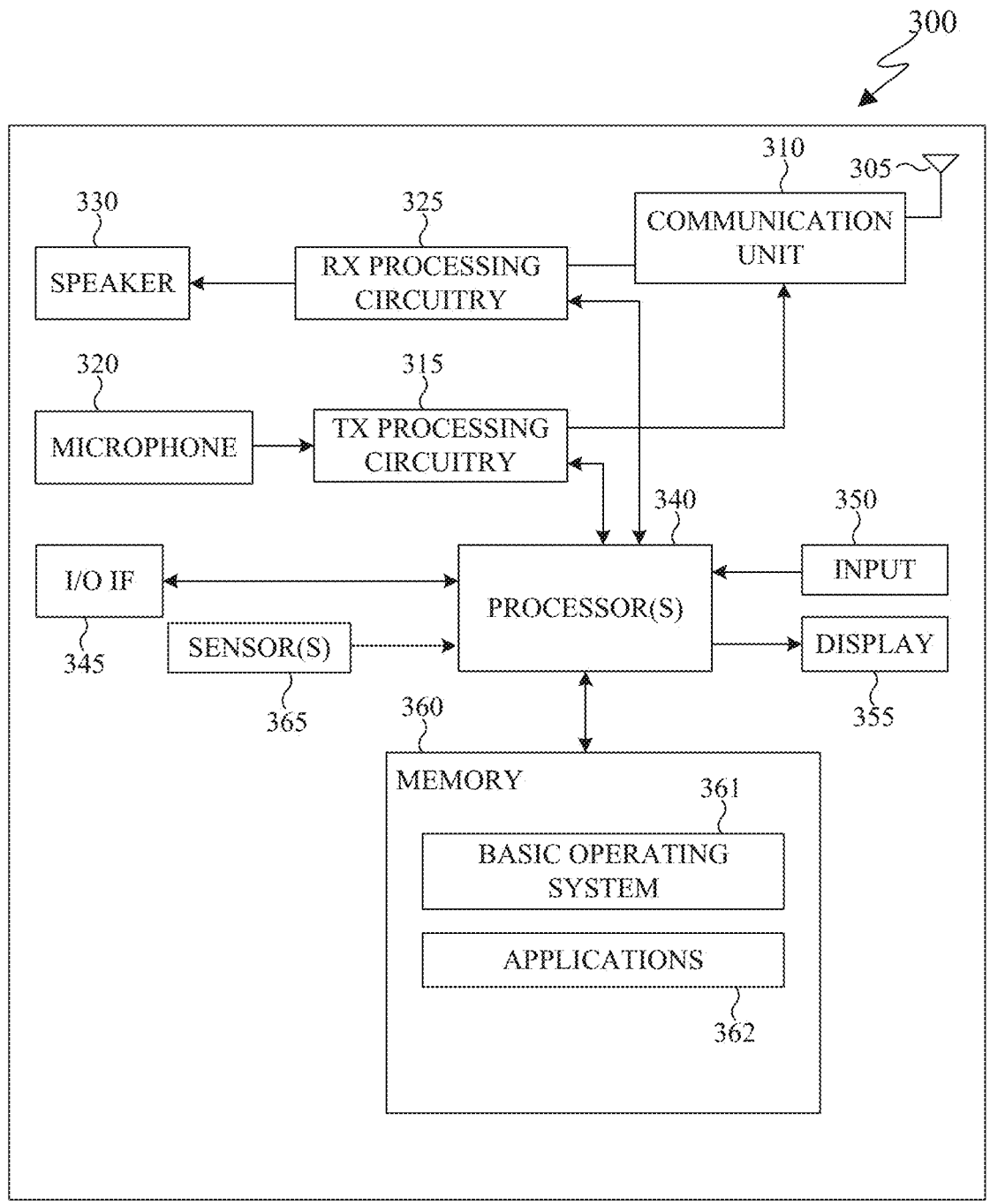
FIG. 3 illustrates an example electronic device in accordance with embodiments of the present disclosure.

FIGS. 2 and 3 illustrate example devices in a computing system in accordance with embodiments of the present disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

Server 200 can represent one or more local servers or one or more neural network servers for processing received inputs through a trained neural network. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, neural network inputs and other data, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, electronic device 300 is useable with data transfer applications, such as providing neural network inputs or activating a function based on a neural network result or output. For example, the electronic device 300 can receive information such as voice data, transfer the data to the server 200, receive a response from the server 200 indicating the result of processing the information through a neural network, and activate a function on the electronic device 300 in accordance with the result. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361, applications 362, and user data 363.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) 365 and/or a camera by providing additional input to processor 340. In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 that includes profile data and user history data. User data 363 can also contain data received from sensor 365. User data 363 can biographical and biometric data.

Electronic device 300 further includes one or more sensor(s) 365 that can meter a physical quantity or detect an activation state of the electronic device 300 and convert metered or detected information into an electrical signal. In certain embodiments, sensor 365 includes inertial sensors (such as accelerometers, gyroscopes, and magnetometers), optical sensors, motion sensors, cameras, pressure sensors, heart rate sensors, altimeter, breath sensors (such as microphone 320), and the like. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300 or another electronic device in communication with the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
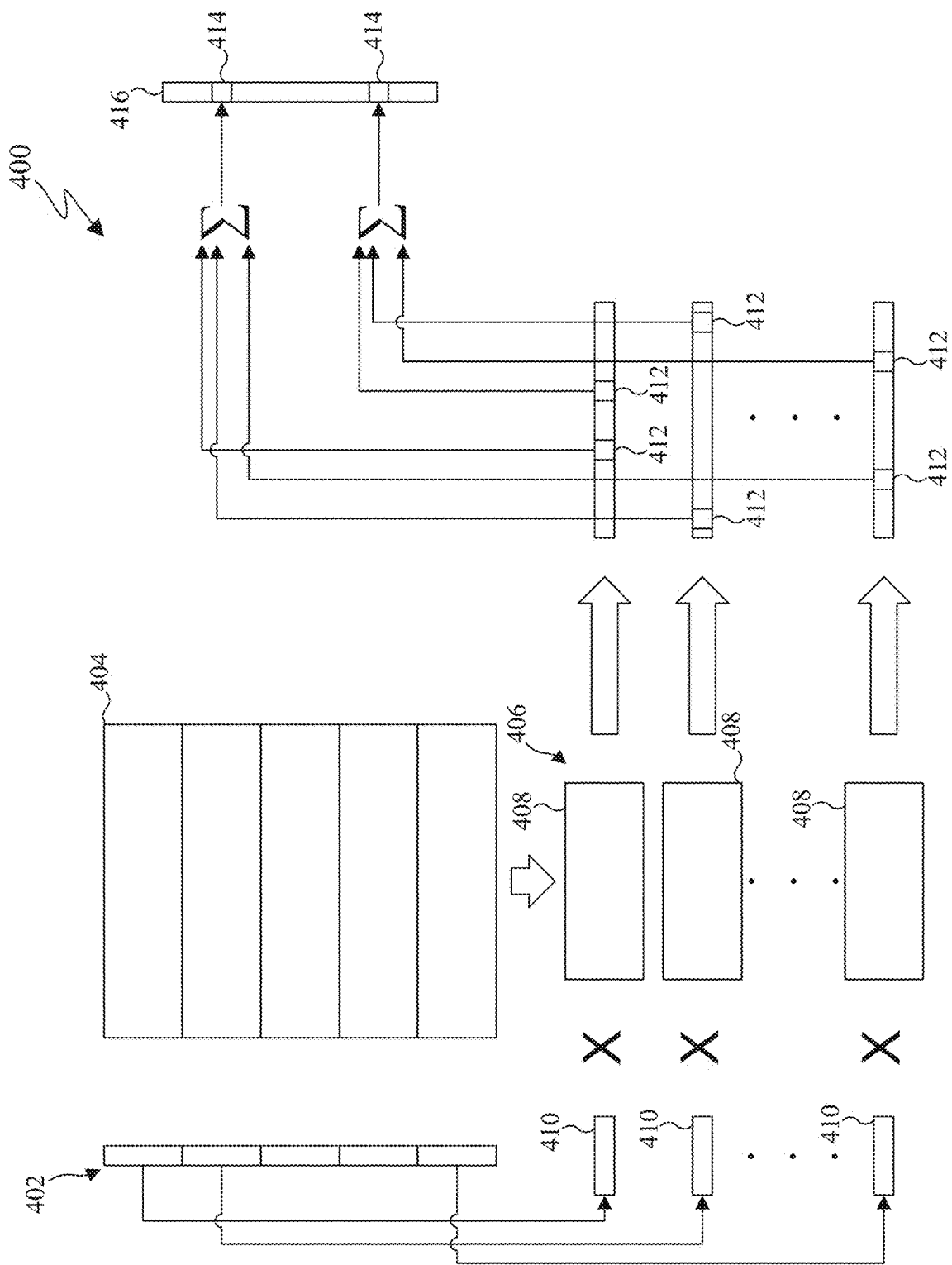
FIG. 4 illustrates a block diagram of a neural network layer result acceleration process in accordance with embodiments of the present disclosure.

FIG. 4 illustrates an example block diagram of a neural network layer result acceleration process 400 in accordance with embodiments of the present disclosure. The processor 210 of the server 200 or the processor 340 of electronic device 300 can perform the process 400. An input vector 402 can be received for processing in a neural network. The input vector 402 can be created from any kind of data capable of being processed by the neural network, such as image data, voice data, or other data. The processor compresses a weighting matrix 404 including a plurality of weight values into a compressed matrix or codebook 406 having dimensions less than the weighting matrix 404, as described herein. The codebook 406 can have a plurality of sub-vectors 408, each sub-vector 408 including one or more weights.

In other neural network configurations, the inputs in the input vector 402 would be applied against the weighting matrix to obtain an output vector. In other neural network configurations, the original matrix W has a size of m*n. The input vector, x, is a n-dimensional vector that can include all values in x∈[0,1). It will be understood that any value range can be scaled to the range of the input vector. The output vector, y, is a m-dimensional vector which can be calculated by y=x*W'. $y_i$ (i=0,1, . . . m−1) can be calculated using the following equation:

$$y_i = \Sigma_{j=0}^{n-1} x_j W_{ij} \quad (1)$$

Equation 1 shows how to obtain the output vector using the original weighting matrix 404. After compressing the original weighting matrix 404 into the codebook 406, the processor approximates the original weighting matrix 404, W, using the codebook and the indexes, and the processor can also calculate the output vector y using the codebook and the indexes, decreasing storage requirements and increasing the speed of the neural network, without sacrificing accuracy.

To approximate the original weighting matrix 404, the processor splits the input vector 402 into sub-vectors 410. The processor then multiplies each sub-vector 410 by one of the sub-vectors 408 of the codebook 406 to produce a plurality of products 412. As described in the present disclosure, multiplication of all possible inputs with the codebook can be pre-calculated in advance to create a series of hash tables storing all possible values. The processor can then retrieves the stored values from the hash tables to further increase the speed and efficiency of the neural network. After the plurality of products 412 are calculated, the processor sums certain ones of the plurality of products 412 together to approximate the value of the dot product of the input vector 402 and a row of the original weighting matrix 404. This approximated value then can be used for one of a plurality of values 414 in a layer response 416. In some embodiments, the processor can input the approximated value into an activation function to generate one of the values of the plurality of values 414 for the layer response 416.

Figure 5:
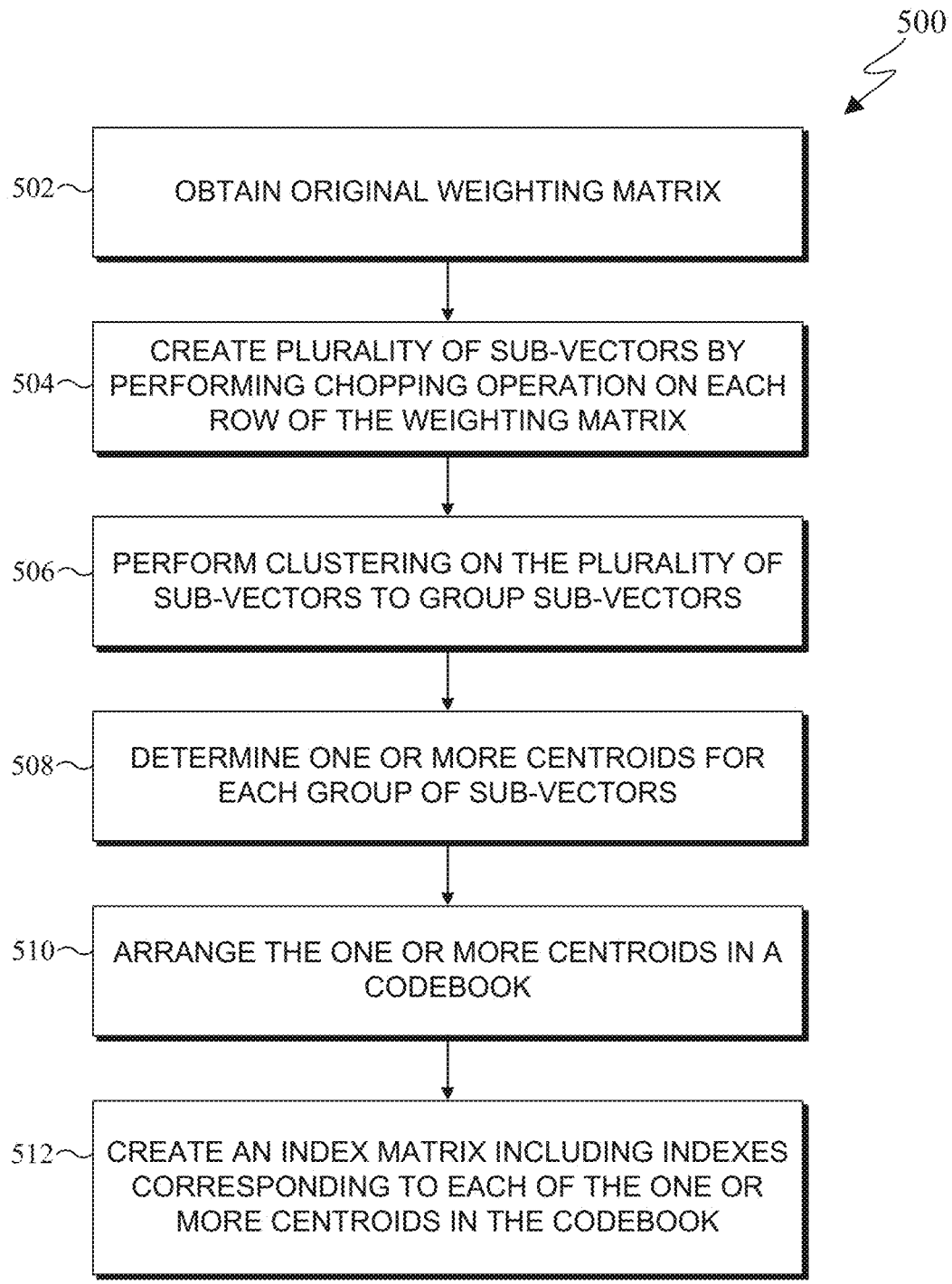
FIG. 5 illustrates a flowchart of a codebook and index matrix creation process in accordance with embodiments of the present disclosure.

FIG. 5 illustrates a flowchart of a codebook and index matrix creation process 500 in accordance with embodiments of the present disclosure. FIG. 5 does not limit the scope of this disclosure to any particular embodiments. While process 500 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the method of creating a codebook and index matrix is described with respect to processor 210 the server 200 of FIG. 2 and processor 340 the electronic device 300 of FIG. 3. However, the process 500 can be used with any other suitable system.

At block 502, the processor obtains the original weighting matrix. The original weighting matrix can have any number of rows, each row including a vector of weights. At block 504, the processor creates a plurality of sub-vectors by chopping each row of the original weighting matrix. In some embodiments, each row can be chopped from the weighting matrix, where each row is a sub-vector. In certain embodiments, each row of the weighting matrix can be chopped into sub-vectors, each sub-vector including a certain number of weights from a certain row of the weighting matrix. At block 506, the processor performs a clustering algorithm on the plurality of sub-vectors to group the sub-vectors with other sub-vectors having similar weight values. It will be understood that various clustering algorithms can be used to cluster the sub-vectors, such as K-means clustering or other methods. At block 508, the processor determines one or more centroids for each group of sub-vectors. At block 510, the processor arranges and stores the one or more centroids within a codebook, such as the codebook 406.

At step 512, the processor creates an index matrix. The index matrix includes index values corresponding to an index of the codebook. Each codebook index can contain each of the one or more centroids for one of the groups of sub-vectors. The processor configures the dimensions of the index matrix such that the position of each index value corresponds to the position of one or more values in the original weighting matrix, or one of the sub-vectors created from the original weighting matrix. For example, if the rows of the original weighting matrix are chopped into two value sub-vectors, each index of the codebook can include two centroids that are the result of the clustering of the two-centroid sub-vectors from the original weighting matrix.

For example, if the first two values of the first row of the original weighting matrix are 0.35 and 0.21, these two values can make up one sub-vector that is then clustered with other two-value sub-vectors having similar weight values. Two centroids can be generated from each cluster of two-value sub-vectors. In the case where 0.35 and 0.21 are the first two values of the first row of the original weighting matrix, the first value of the first row of the index matrix can indicate the index of the codebook where the centroids produced from 0.35, 0.21, and the other values clustered with these values are stored. In this example, if the first value of the first row of the index matrix is a 9, then the centroids created from 0.35, 0.21, and the other clustered values, are located in the codebook at index 9 (the $10^{th}$ row of the codebook).

The index matrix can have the same number of rows as the original weighting matrix, but the number of index values in each row of the index matrix can be less than the number of weights in each row of the original weighting matrix. For example, if a weighting matrix including 1024 values per row was divided into two-value sub-vectors, each row of the index matrix can include 512 index values, one value for each two-value sub-vector.

Figure 6:
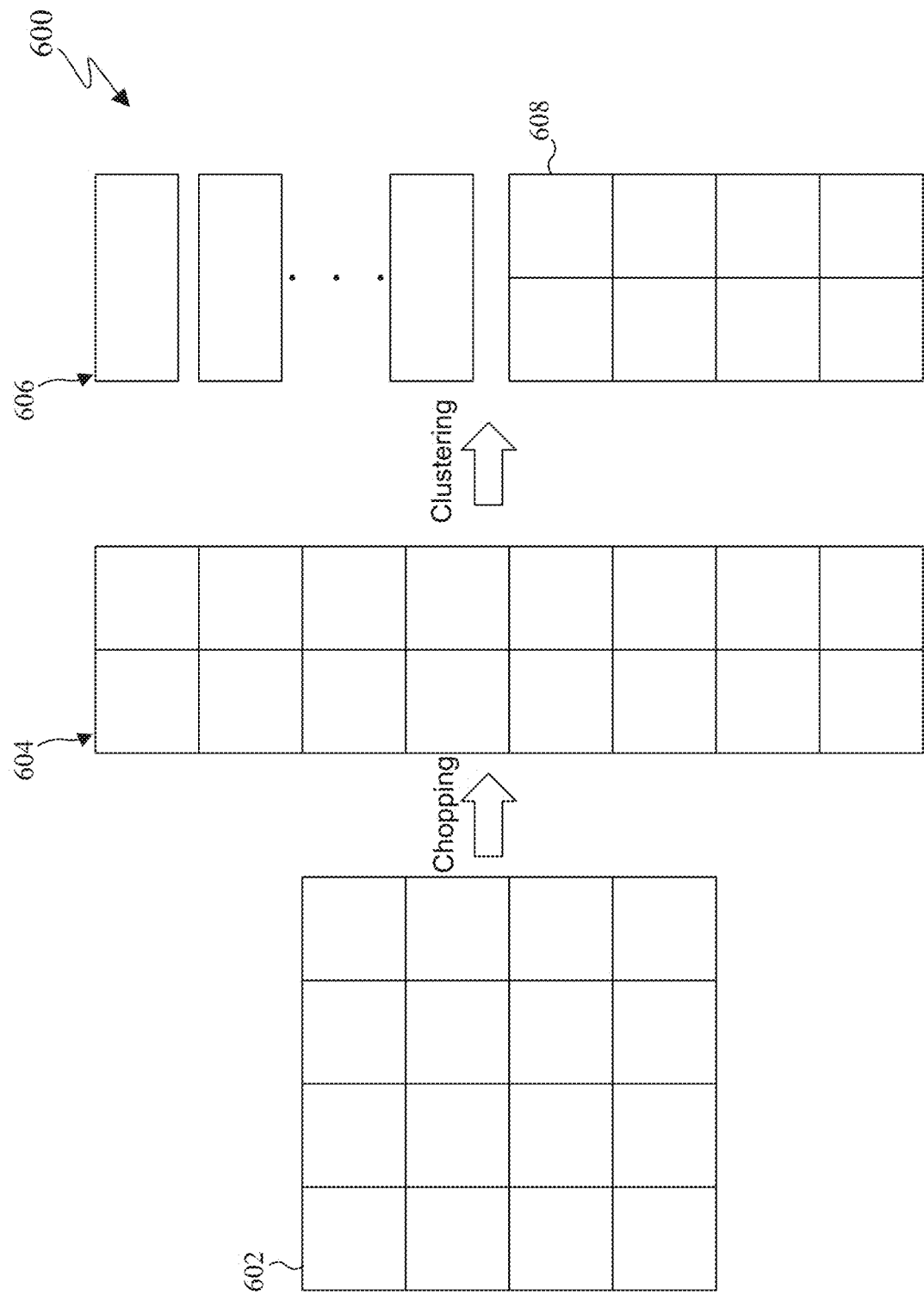
FIG. 6 illustrates a block diagram of a codebook and index matrix generation process in accordance with embodiments of the present disclosure.

FIG. 6 illustrates a block diagram of a codebook and index matrix generation process 600 in accordance with embodiments of the present disclosure. The processor 210 of the server 200 or the processor 340 of electronic device 300 can perform the process 600. The embodiment of the codebook and index matrix generation process 600 is for illustration only and other embodiments could be used without departing from the scope of this disclosure.

The codebook and index matrix generation process 600 includes a weighting matrix 602 including a number of weighting values. The processor chops or separates the weighting matrix into one or more sub-vectors 604. The processor performs a clustering algorithm on the plurality of sub-vectors to group the sub-vectors with other sub-vectors having similar weight values, and the processor determines one or more centroids from the clusters. It will be understood that various clustering algorithms can be used to cluster the sub-vectors, such as K-means clustering or other methods. The processor arranges and stores the one or more centroids within a codebook 606.

The processor also creates an index matrix 608 to label the sub-vectors with the corresponding index in the codebook 606 where the one or more centroids associated with the sub-vector can be found.

Figure 7:
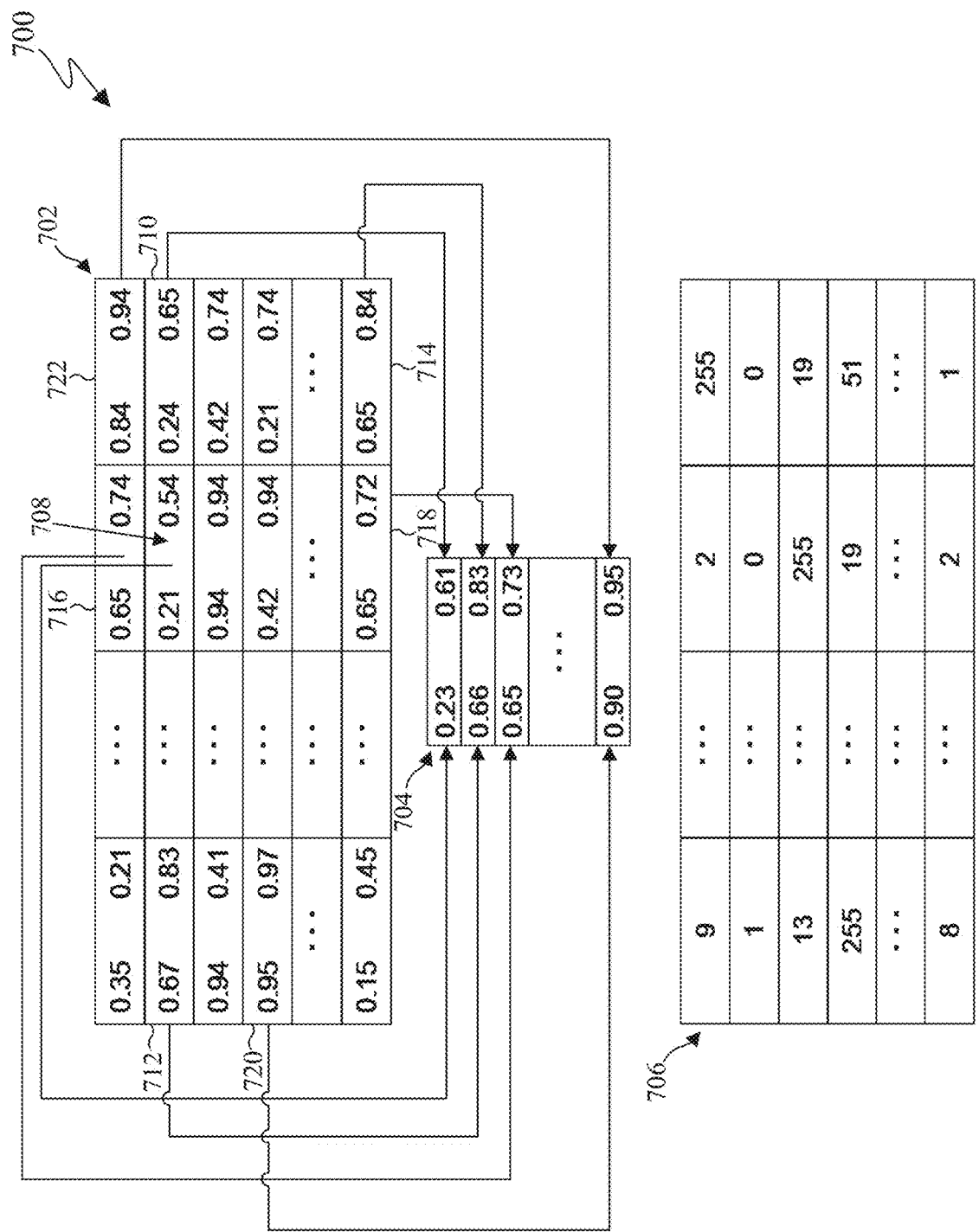
FIG. 7 illustrates an example of a codebook and index matrix generation process showing an example weighting matrix, codebook, and index matrix in accordance with embodiments of the present disclosure.

FIG. 7 illustrates an example of a codebook and index matrix generation process 700 showing an example weighting matrix 702, codebook 704, and index matrix 706 in accordance with embodiments of the present disclosure. The processor 210 of the server 200 or the processor 340 of electronic device 300 can perform the process 700. The embodiment shown in FIG. 7 is for illustration only. Other embodiments of the process 700 could be used without departing from the scope of this disclosure. For example, the weighting matrix 702, codebook 704, and index matrix 706 can include different values than that shown in FIG. 7, and can be of any other dimension or size.

The weighting matrix 702 includes a plurality of weight values. The weighting matrix 702 can be of various dimensions or sizes, requiring various amounts of storage space on the server 200, the electronic device 300, or in another system or device. For example, the weighting matrix 702 can be a 1024×1024 matrix that includes weight values in float format. In that case, the weighting matrix 702 would use over four million bytes of storage (1024*1024*4).

The processor can separate the weighting matrix into sub-vectors for clustering the sub-vectors to determine centroids to be used for the codebook 704. As illustrated in FIG. 7, the processor separates the weighting matrix 702 into sub-vectors having two weight values each. The processor then clusters the sub-vectors, determines one or more centroids from the clustered sub-vectors, and stores the one or more centroids in each row of the codebook 704. In the example illustrated in FIG. 7, a first row of the codebook 704 includes two centroids created from a sub-vector 708 of the weighting matrix 702 that includes weight values of 0.21 and 0.54 with at least another sub-vector 710 of the weighting matrix 702 that includes weight values of 0.24 and 0.65. In this example, the processor clusters at least the sub-vectors 708 and 710, determines two centroids, and stores the two centroids in the first row of the codebook 704, the two centroids having values of 0.23 and 0.61.

The index matrix 706 records the index of the codebook 704 where centroids are stored for each of the sub-vectors of the weighting matrix 702 used to create the centroids in that particular index of the codebook 704. For example, for the first row of the codebook 704 having centroids generated from at least the sub-vector 708 and the sub-vector 710, the processor stores index values of 0 (indicating the first row of the codebook 704) in locations in the index matrix that correspond to the locations of the sub-vectors 708 and 710. As shown in FIG. 7, sub-vector 708 is located as the penultimate sub-vector in the second row of the weighting matrix 702 and sub-vector 710 is the last sub-vector of the second row of the weighting matrix 702. Therefore, the processor stores the index values of 0 in the index matrix 706 at the penultimate index of the second row and the last index of the second row of the index matrix 706 to match the locations of the sub-vectors 708 and 710 in the weighting matrix 702.

In the example illustrated in FIG. 7, the processor populates a second row of the codebook 704 with two centroids created from a sub-vector 712 of the weighting matrix 702 that includes weight values of 0.67 and 0.83 with at least another sub-vector 714 of the weighting matrix 702 that includes weight values of 0.65 and 0.84. The processor clusters at least the sub-vectors 712 and 714, determines two centroids from the clustered sub-vectors, and stores the two centroids in the second row of the codebook 704, the two centroids having values of 0.66 and 0.83.

The index matrix 706 records the indexes for the centroids associated with the sub-vectors 712 and 714. The processor stores index values of 1 (indicating the second row of the codebook 704) in locations in the index matrix that correspond to the locations of the sub-vectors 712 and 714. As shown in FIG. 7, sub-vector 712 is the first sub-vector in the second row of the weighting matrix 702 and sub-vector 714 is the last sub-vector of the last row of the weighting matrix 702. Therefore, the processor stores the index values of 1 in the index matrix 706 at the first index of the second row and the last index of the last row of the index matrix 706 to match the locations of the sub-vectors 712 and 714 in the weighting matrix 702.

In the example illustrated in FIG. 7, the processor populates a third row of the codebook 704 with two centroids created from a sub-vector 716 of the weighting matrix 702 that includes weight values of 0.65 and 0.74 with at least another sub-vector 718 of the weighting matrix 702 that includes weight values of 0.65 and 0.72. The processor clusters at least the sub-vectors 716 and 718, determines two centroids from the clustered sub-vectors, and stores the two centroids in the third row of the codebook 704, the two centroids having values of 0.65 and 0.73.

The index matrix 706 records the indexes for the centroids associated with the sub-vectors 716 and 718. The processor stores index values of 2 (indicating the third row of the codebook 704) in locations in the index matrix that correspond to the locations of the sub-vectors 716 and 718. As shown in FIG. 7, sub-vector 716 is the penultimate sub-vector in the first row of the weighting matrix 702 and sub-vector 718 is the penultimate sub-vector of the last row of the weighting matrix 702. Therefore, the processor stores the index values of 2 in the index matrix 706 at the penultimate index of the first row and the penultimate index of the last row of the index matrix 706 to match the locations of the sub-vectors 716 and 718 in the weighting matrix 702.

In the example illustrated in FIG. 7, the processor populates a last row of the codebook 704 with two centroids created from a sub-vector 720 of the weighting matrix 702 that includes weight values of 0.95 and 0.97 with at least another sub-vector 722 of the weighting matrix 702 that includes weight values of 0.84 and 0.94. The processor clusters at least the sub-vectors 720 and 722, determines two centroids from the clustered sub-vectors, and stores the two centroids in the last row of the codebook 704, the two centroids having values of 0.90 and 0.95.

The index matrix 706 records the indexes for the centroids associated with the sub-vectors 720 and 722. The processor stores index values of 255 (indicating the last ($256^{th}$) row of the codebook 704) in locations in the index matrix that correspond to the locations of the sub-vectors 720 and 722. As shown in FIG. 7, sub-vector 720 is the first sub-vector in the fourth row of the weighting matrix 702 and sub-vector 722 is the last sub-vector of the first row of the weighting matrix 702. Therefore, the processor stores the index values of 255 in the index matrix 706 at the first index of the fourth row and the last index of the first row of the index matrix 706 to match the locations of the sub-vectors 720 and 722 in the weighting matrix 702. It will be understood that more than two sub-vectors from the weighting matrix 702 can be clustered to generate the centroids stored in the codebook 704. FIG. 7 illustrates such, as the penultimate index of the third row of the index matrix 706 includes a value of 255, indicating that a sub-vector of the weighting matrix 702 that includes weight values 0.94 and 0.94 was also clustered with the sub-vectors 720 and 722 to calculate the centroids in the last row of the codebook 704.

Since the index matrix 706 records index values that can correspond to more than one value of the weighting matrix 702, and since the processor can store the index values in byte number format rather than the float format used by the weighting matrix 702, the index matrix 706 can be much smaller in size than the weighting matrix 702. For example, if the weighting matrix 702 illustrated in FIG. 7 is a 1024×1024 matrix storing float values, the index matrix 706 can include half as many values per row as the weighting matrix 702, since each index value in the index matrix 706 corresponds to two weight values in the weighting matrix 702. In this example, the index matrix 706 can be a 1024× 512 matrix. Since the index values may be only one byte in size, the index matrix 706 may be just over half a million bytes in size (1024*512*1), compared to four million bytes for the 1024×1024 weighting matrix.

The codebook also can be much smaller in size compared to the weighting matrix 702. For example, the codebook 704 illustrated in FIG. 7 can have 256 rows at two float values per row, using only 2048 bytes of storage (256*2*4). Therefore, the storage space used by the codebook 704 and the index matrix 706 are less than the weighting matrix. Even when storing hash tables that are each the codebook multiplied by each possible input value, such as input values between 0 and 1, the storage used by all the hash tables and by the index matrix can still be much less than the storage used by the weighting matrix.

Although FIG. 7 illustrates one example of a process 700, various changes can be made to FIG. 7. For example, the process 700 could include weighting matrices, codebooks, and index matrices of various dimensions and sizes, and each including various weight values, centroid values, and index values. In general, weighting matrices, and codebooks and index matrices created therefrom, can come in a wide variety of configurations depending on the neural network configuration used, and FIG. 7 does not limit the scope of this disclosure to any particular configuration.

Figure 8:
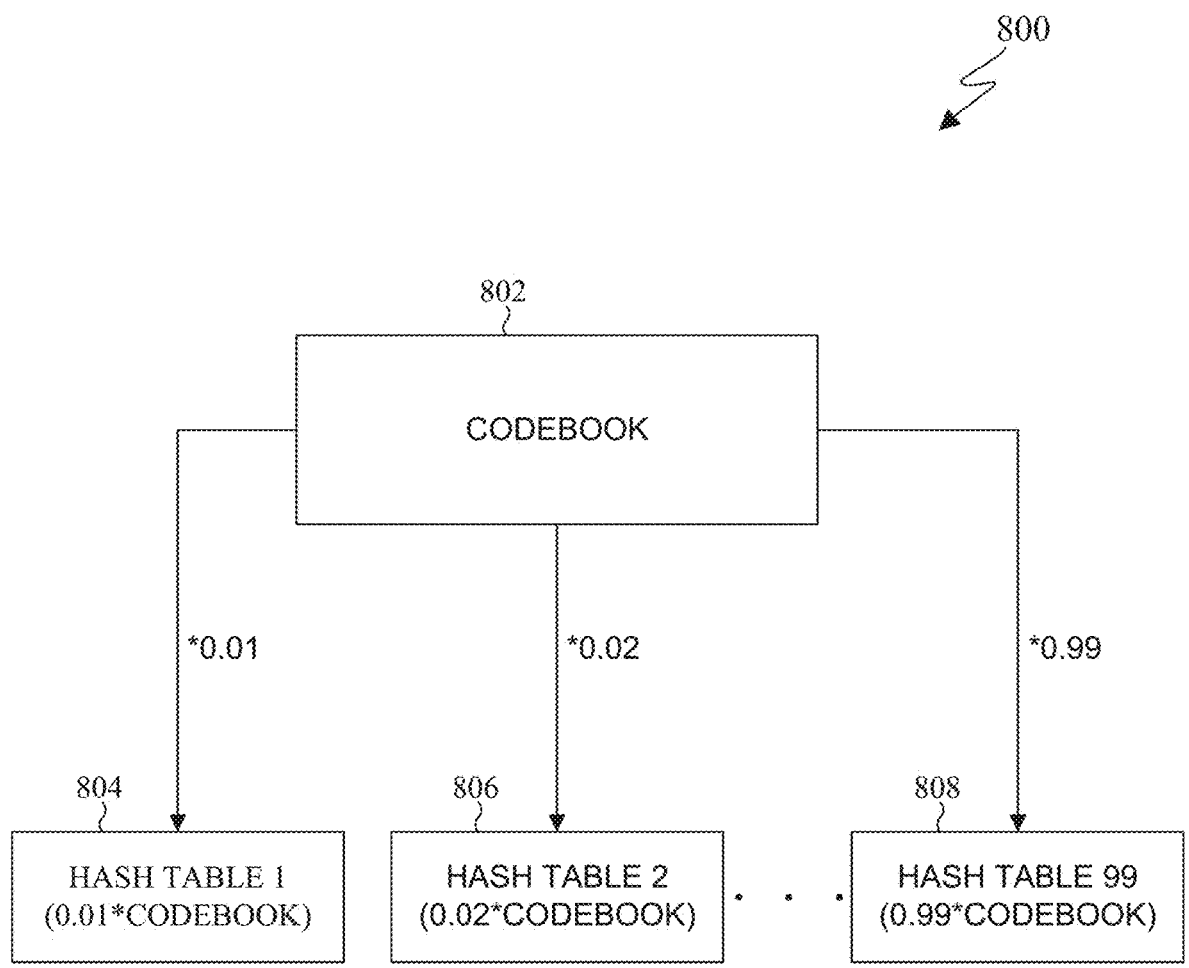
FIG. 8 illustrates a block diagram of a hash table creation process in accordance with embodiments of the present disclosure.

FIG. 8 illustrates a block diagram of a hash table creation process 800 in accordance with embodiments of the present disclosure. The processor 210 of the server 200 or the processor 340 of electronic device 300 can perform the process 800. In order to provide further increased speed for a neural network in addition to the more efficient storage provided by this disclosure, the processor can create and store in memory hash tables containing every possible input multiplied by the codebook. This allows for the ability to look up a hash table for each input value and retrieve the value of the input multiplied by the appropriate weight, reducing the time used by the neural network to process the inputs since the multiplying step of the dot product operation will not need to be performed to produce the layer result.

The input vector, x, can be an n-dimensional vector that includes input values for the neural network, for example, all values in x∈[0,1). The hash tables can be generated ahead of time for all the input values. When a new input vector is received for processing by the neural network, the inputs in the input vector can be scaled to this [0,1) range so that the input values match the generated hash tables. The output vector, y, produced by the neural network, is comprised of n values denoted as $y_0, y_1, \ldots, y_{n-1}$. Using $y_i$ as an example, in the original weighting matrix, $y_i$ is obtained by calculating the dot product between the input vector x and the i th row in W, e.g. $w_i$. In accordance with embodiments of the present disclosure, $w_i$ can be approximated using the index matrix and the codebook by pre-calculating a series of hash tables. Each hash table can contain the products produced by multiplying a value in the range (0,1) by each centroid in the codebook. Thus, whatever the input vector, the multiplication between x and any codebook entry can be obtained by looking up the hash tables without needing to perform each multiplication step for the inputs at runtime.

As illustrated in FIG. 8, a codebook 802 can be used by the processor to create each hash table. The processor creates the hash tables by multiplying the codebook 802 by each possible input value between 0 and 1, such as the range of [0,1). The processor can generate hash tables for each value from 0.01 to 0.99. This results in hash tables that include values equal to one of the inputs multiplied by every weight value (centroid) stored in the codebook. As illustrated in FIG. 8, the processor multiplies the codebook 802 by 0.01 to create a first hash table 804. The processor multiplies the codebook 802 by 0.02 to create a second hash table 806. This process continues until the processor multiplies codebook 802 by 0.99 to create a ninety-ninth hash table 808, for a total of 99 hash tables created.

Figure 9:
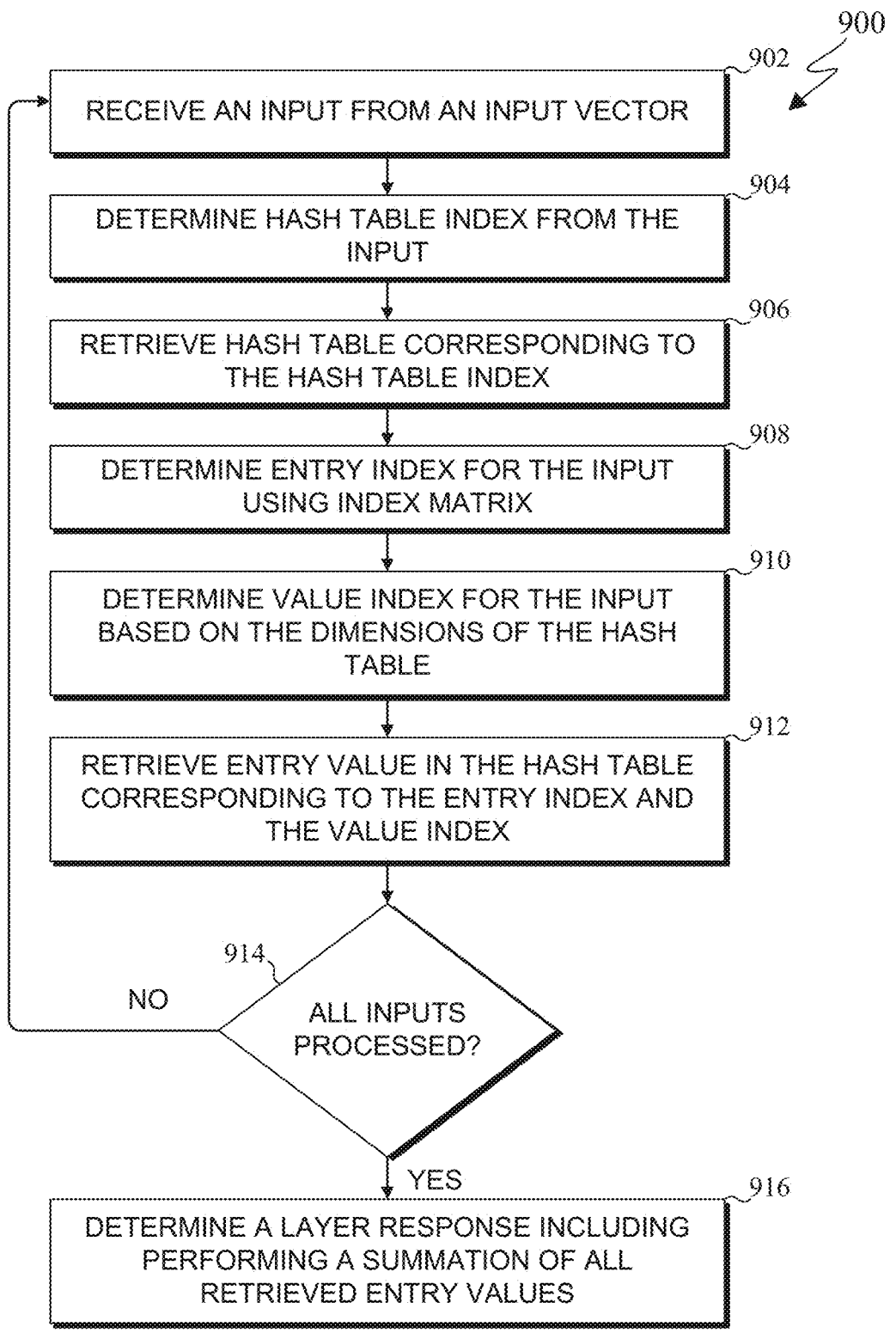
FIG. 9 illustrates a flowchart of a neural network layer response process using a codebook and hash tables in accordance with embodiments of the present disclosure.

FIG. 9 illustrates a flowchart of a layer response process 900 using a codebook and hash tables in accordance with embodiments of the present disclosure. FIG. 9 does not limit the scope of this disclosure to any particular embodiments. While process 900 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 900 is described with respect to processor 210 of the server 200 of FIG. 2 and processor 340 of the electronic device 300 of FIG. 3. However, the process 900 can be used with any other suitable system.

At block 902, the processor receives an input from an input vector. The input vector can be an n-dimensional vector containing any number of values. In some embodiments, the values of the input vector are scaled to a range of [0,1). As described herein, in the original weighting matrix, $y_i$ will be obtained by calculating the dot product between the input vector x and the i th row in W, e.g. $w_i$. As described herein, $w_i$ can be approximated using a series of indexes and the codebook. A series of hash tables can be pre-calculated which contain all products between any value of the range (0,1) and the codebook, for a total of 99 hash tables. $w_i$ is replaced by a series of indexes, $idx_0$, $idx_1$, ... $idx_{k-1}$, after compressing a weighting matrix into a codebook in accordance with embodiments of the present disclosure. Each entry in the codebook can be a sd-dimensional vector, where k*sd=n. For example, the codebook can be a 3-dimensional vector, wherein each entry of the codebook includes three centroids.

Equation 1 of the present disclosure can be approximated without a decrease in accuracy of the neural network by retrieving values stored in hash tables that include each possible input already multiplied by the codebook including centroids created from clustered weights of the original weighting matrix. The hash tables can be looked up to get an approximated value similar to $x_j w_{ij}$ where $j \in [0, n-1]$.

At block 904, the processor determines a hash table index, or table index, from the input received in block 902. The table index indicates which one of the hash tables includes the value of the received input multiplied by the appropriate weight according to the neural network. For example, if the received input is the first input in the input vector, the value can be an approximation of the product of the received input and $w_{11}$ of the original weighting matrix. The table index, T_idx, can be determined by the Equation 2:

$$T\_idx = x_j * 100 \tag{2}$$

For example, if the received input value is 0.45, T_idx=0.45*100. Therefore, in that example, the table index is 45. At block 906, the processor retrieves the hash table corresponding to the hash table index. In some embodiments of the present disclosure, the hash tables can be ordered with respect to the input value multiplied by the codebook to create the hash table. Therefore, using T_idx, the processor can retrieve the hash table corresponding to the input value received in block 902. Using the example where the input is 0.45, a hash table would have previously been created by multiplying 0.45 by the codebook. This hash table can have been labeled hash table 45, and the processor retrieves the hash table 45 at block 906.

At block 908, the processor determines an entry index for the input using an index matrix. The index matrix is in accordance with embodiments of the present disclosure. The entry index is an index of the hash table where the value is stored for the input received in block 902 multiplied by the appropriate weight. The entry index, E_idx, is one of ($idx_0$, $idx_1$, ... $idx_{k-1}$), for the position j. Determining a chopping position is shown by Equations 3:

$$u = j/sd \tag{3}$$

In Equation 3, j is the index of the input vector and sd is the number of dimensions of the of the codebook, where sd can indicate how many values are stored in each entry index of the codebook. Using the example where the input value received in block 902 is 0.45, assume that 0.45 is the $28^{th}$ input in the input vector (input vector index 27), and sd=3. In this example u=27/3, and so u=9. Once the processor determines u, the entry index, E_idx, the processor can determine the index by Equation 4:

$$E\_idx = idx_u \tag{4}$$

Thus E_idx is the $u^{th}$ entry in table T_idx. As described herein, idx also indicates an index of the index matrix created when the codebook and hash tables were created. Therefore, the processor can obtain E_idx by retrieving the index value in the index matrix that is at the index equal to u. Using the example where u=9, if a value of 50 is stored in the $9^{th}$ index of the index matrix, then E_idx=50, indicating that the value to be used in approximating the layer response is stored at entry index 50 (or the $51^{st}$ row) of the $45^{th}$ hash table.

At block 910, the processor determines a value index for the input based on the dimensions of the hash table (also the dimensions of the codebook). Each entry corresponding to each entry index in the hash table is an sd-dimensional vector, such that each entry in the hash table can have more than one value stored in the entry. Determining the entry index, E_idx, provides the entry in the hash table where the value to be used can be found, but, when multiple values are stored in that entry, the processor can use a value index, V_idx, to determine which value in the entry is the appropriate value. The processor can determine V_idx by Equation 5:

$$V\_idx = j \% sd \tag{5}$$

In Equation 5, '%' denotes the modulo operator. After the processor determines the three indexes, the processor can use the V_idx th value of the E_idx th entry in the table T_idx to approximate $x_j w_{ij}$. Using the example where the input value is 0.45, E_idx=50, j=27, and sd=3, then V_idx=27% 3, and so V_idx=0. In this example where each entry in the hash table is a 3-dimesnional vector, an entry value to be used in approximating the layer response is the first of three values stored in entry index 50 of hash table 45. It will be understood that in scenarios where one-dimensional vectors are used, sd can be removed from the equations or Equation 5 can be skipped, since every entry index will only have one value in such scenarios.

At block 912 of the process 900, the processor retrieves from the hash table the entry value corresponding to the entry index and the value index. The processor can add the retrieved entry value to a vector of entry values. At decision block 914, the processor determines whether all inputs in the input vector have been processed for a particular layer response value. If not, the process 900 moves back to block 902 to process another input from the input vector. If at decision block 914, the processor determines that all inputs in the input vector have been processed and corresponding entry values retrieved from the hash tables, the process 900 moves to block 916. At block 916, the processor performs a summation operation on each entry value retrieved during the process 900 in order to determine a layer response. In some embodiments, the result of the summation operation can be applied to an activation function to determine a value of the layer response.

Figure 10:
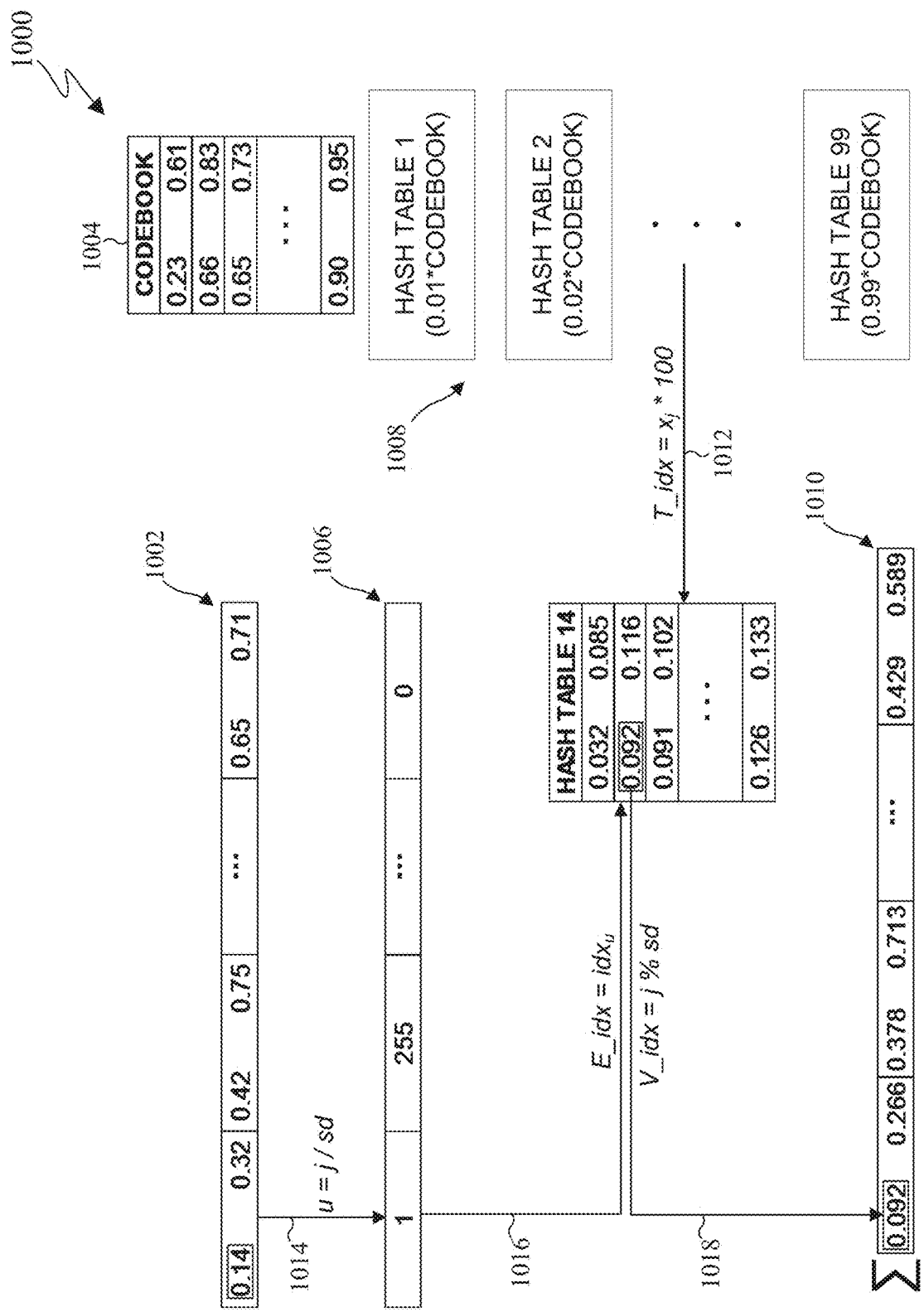
FIG. 10 illustrates a block diagram of one example of an entry value retrieval process in accordance with embodiments of the present disclosure.

FIG. 10 illustrates a block diagram of one example of an entry value retrieval process 1000 in accordance with embodiments of the present disclosure. The processor 210 of the server 200 or the processor 340 of electronic device 300 can perform the process 1000. In the example illustrated in FIG. 10, an input vector 1002 including 512 input values is to be processed through a neural network. In FIG. 10, the processor has already compressed an original weighting matrix into a codebook 1004 and the processor has already created an index matrix 1006. The example in FIG. 10 illustrates one row of the index matrix 1006. The processor has also already created a series of hash tables 1008 by multiplying the codebook 1004 with every value in the range of [0.01,0.99] to create 99 hash tables.

To determine the layer response, the processor retrieves from the hash tables an entry value in the hash tables corresponding to each input in the input vector 1002 and the processor includes the entry value in a summation vector 1010. After each input in the input vector 1002 is processed, the processor performs a summation operation on all values in the summation vector 1010, such as described in the present disclosure with respect to FIG. 9. This process can be repeated for each row of the index matrix, using the same input vector 1002 for each new row of the index matrix, in order to produce a full layer response.

In the example illustrated in FIG. 10, a first input value in the input vector 1002 is 0.14. In this example, for the first input, j=0 and $x_j$=0.14. The processor can find the hash table including the entry value to be added to the summation vector 1010 by using Equation 2, T_idx=$x_j$*100. For j=0, T_idx=0.14*100, and so T_idx=14, indicating that hash table 14 is where the entry value is stored. At a step 1012, the processor retrieves hash table 14. In this example, the codebook and hash tables include two-dimensional sub-vectors, and thus sd=2. To determine the entry index, E_idx, for hash table 14, the processor can use Equation 3, u=j/sd, at a step 1014 to map the input to the index matrix 1006. Since j=0 and sd=2, u=0/2. Therefore, u=0, indicating that index 0 of the index matrix includes the entry index.

At a step 1016, the processor determines the entry index using Equation 4, E_idx=$idx_u$, so E_idx=$idx_0$. In this example, index 0 of the index matrix, $idx_0$, includes a value of 1. Therefore, E_idx=1, indicating that the entry value for j=0 is included at entry index 1 (row 2) of the hash table 14. Entry index 1 of the hash table 14 includes the products of multiplying 0.14 by the values in entry index 1 of the codebook 1004: 0.092 (0.14*0.66) and 0.116 (0.14*0.83). At a step 1018, the processor determines a value index. The processor stores, as the first value in the summation vector 1010, the entry value corresponding to the entry index and the value index in the hash table 14. The processor determines the value index according to Equation 5, V_idx=j % sd. In this example, V_idx=0% 2, and so V_idx=0. Since V_idx=0, the processor looks up the first entry value in entry index 1 of hash table 14 (0.092) and the processor includes this first entry value as the first value in the summation vector 1010.

This process described with respect to FIG. 10 is repeated for each input value in the input vector 1002. Once the processor looks up an entry value in the hash tables for each input value in the input vector 1002 and the stores each entry value in the summation vector 1010, the processor performs a summation operation on all the values in the summation vector 1010. In some embodiments, the processor applies an activation function to the result of the summation operation to produce a layer result to be passed on to a neuron (also known as node or unit) in the next hidden layer of the neural network, or to be used as an output in the output layer. The process described with respect to FIG. 10 can be repeated for each row of the index matrix to produce a plurality of layer responses to be passed to the next layer of the neural network.

The present disclosure provides for a reduction in neural network size and a substantial increase in neural network processing speed. In one example, an original model used for performing intent classification on voice data has a size of 12.5 million bytes. The time elapsed for one intent classification is 9.48 milliseconds, with a recognition rate of 99.68%. A first compact model created from this original model includes one dimensional sub-vectors and has a model size of 3.01 million bytes, a size reduction of 75% from the original model. The time elapsed for one intent classification using the first compact model is 2.97 milliseconds, a speed increase of 219% from the original model. The first compact model still has a recognition rate of 99.68%.

As another example, a second compact model including two dimensional sub-vectors created from the original model has a model size of 1.4 million bytes, a size reduction of 88% from the original model. The time elapsed for one intent classification using the second compact model is 7.18 milliseconds, a speed increase of 32% from the original model. The second compact model still has a recognition rate of 99.68%. The present disclosure thus provides an improvement to the functioning of the server 200 or the electronic device 300, or other systems running a neural network, by reducing the amount of memory used to run the neural network and providing increased speed of the neural network, while maintaining accuracy.

It should be noted that the illustrated regions of the figures are merely examples. Also, it should be noted that although the figures are shown in two dimensions, the zones are often three dimensional. It also should be noted that for clarity and ease of illustration, the figures are not necessarily made to scale.

Although the figures illustrate different examples of user equipment, various changes can be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a neural network, wherein at least a portion of the neural network is stored in a memory of an electronic device, the method being performed by at least one processor, the method comprising:
  generating a codebook from a weighting matrix of the neural network, which includes:
    creating a plurality of sub-vectors from the weighting matrix;
    generating, by performing a clustering algorithm on the plurality of sub-vectors, a cluster of sub-vectors having similar weight values;
    determining, for the cluster, a centroid for each sub-vector in the cluster; and
    storing the centroid for each sub-vector in the cluster at a location in the codebook associated with the cluster;
  building an index matrix from the codebook, wherein the index matrix includes one or more index values, and wherein one of the one or more index values represents the location in the codebook associated with the cluster; and
  generating a hash table for each input of a plurality of inputs, the hash table being a product of multiplication of the input and the generated codebook.

2. The method of claim 1, wherein generating the hash table includes multiplying one of the plurality of inputs by the codebook.

3. The method of claim 2, wherein the hash table includes one or more entry values corresponding to an entry index.

4. The method of claim 1, wherein creating the plurality of sub-vectors includes chopping each row of the weighting matrix.

5. The method of claim 4, wherein generating the hash table for each input of the plurality of inputs includes multiplying one of the plurality of inputs by each centroid of the codebook.

6. The method of claim 5, wherein the hash table includes one or more entry values corresponding to an entry index.

7. An electronic device, comprising:
  a communication interface;
  a memory storing at least a portion of a neural network; and
  at least one processor coupled to the communication interface and the memory, the at least one processor configured to:
    generate a codebook from a weighting matrix of the neural network, wherein, to generate the codebook, the at least one processor is configured to:
      create a plurality of sub-vectors from the weighting matrix;
      generate, by performing a clustering algorithm on the plurality of sub-vectors, a cluster of sub-vectors having similar weight values;
      determine, for the cluster, a centroid for each sub-vector in the cluster; and
      store the centroid for each sub-vector in the cluster at a location in the codebook associated with the cluster;
    build an index matrix from the codebook, wherein the index matrix includes one or more index values, and wherein one of the one or more index values represents the location in the codebook associated with the cluster; and
    generate a hash table for each input of a plurality of inputs, the hash table being a product of multiplication of the input and the generated codebook.

8. The electronic device of claim 7, wherein the at least one processor is further configured to:
  multiply one of the plurality of inputs by the codebook in order to generate the hash table.

9. The electronic device of claim 8, wherein the hash table includes one or more entry values corresponding to an entry index.

10. The electronic device of claim 7, wherein, to create the plurality of sub-vectors, the at least one processor is further configured to chop each row of the weighting matrix.

11. The electronic device of claim 10, wherein the at least one processor is further configured to:
  multiply one of the plurality of inputs by each centroid of the codebook in order to generate the hash table.

12. The electronic device of claim 11, wherein the hash table includes one or more entry values corresponding to an entry index.

13. A non-transitory computer readable medium embodying a computer program, the computer program comprising computer readable program code that, when executed by at least one processor of an electronic device, causes the at least one processor to:
  generate a codebook from a weighting matrix of a neural network, wherein the computer readable program code that when executed causes the at least one processor to generate the codebook comprises computer readable program code that when executed causes the at least one processor to:
    create a plurality of sub-vectors from the weighting matrix;
    generate, by performing a clustering algorithm on the plurality of sub-vectors, a cluster of sub-vectors having similar weight values;
    determine, for the cluster, a centroid for each sub-vector in the cluster; and
    store the centroid for each sub-vector in the cluster at a location in the codebook associated with the cluster;
  build an index matrix from the codebook, wherein the index matrix includes one or more index values, and wherein one of the one or more index values represents the location in the codebook associated with the cluster; and
  generate a hash table for each input of a plurality of inputs, the hash table being a product of multiplication of the input and the generated codebook.

14. The non-transitory computer readable medium of claim 13, further comprising computer readable program code that, when executed by the at least one processor, causes the at least one processor to:
  multiply one of the plurality of inputs by the codebook in order to generate the hash table.

15. The non-transitory computer readable medium of claim 14, wherein the hash table includes one or more entry values corresponding to an entry index.

16. The non-transitory computer readable medium of claim 13, further comprising computer readable program code that, when executed by the at least one processor, causes the at least one processor to:
  create the plurality of sub-vectors by chopping each row of the weighting matrix.

17. The non-transitory computer readable medium of claim 16, further comprising computer readable program code that, when executed by the at least one processor, causes the at least one processor to:
  multiply one of the plurality of inputs by each centroid of the codebook in order to generate the hash table.

18. The non-transitory computer readable medium of claim 17, wherein the hash table includes one or more entry values corresponding to an entry index.

19. A method for a neural network, wherein at least a portion of the neural network is stored in a memory of an electronic device, the method comprising:
receiving an input from a vector of inputs;
determining a table index based on a value of the input; and
retrieving a hash table from a plurality of hash tables, wherein the hash table corresponds to the table index, wherein the hash table is created using a product of multiplication of the value of the input and values of a compressed weighting matrix codebook, and wherein the neural network is trained using an original weighting matrix that is compressed into the compressed weighting matrix codebook.

20. The method of claim 19, further comprising:
determining an entry index of the hash table based on an index matrix, wherein the index matrix includes one or more index values, and each of the one or more index values corresponds to a vector in the hash table; and
determining an entry value in the hash table corresponding to the entry index.

21. The method of claim 20, wherein determining the entry value includes determining a value index based on dimensions of the hash table, wherein the vector in the hash table includes one or more entry values, and wherein the value index corresponds to one of the one or more entry values in the vector in the hash table.

22. The method of claim 20, further comprising:
determining a layer response including performing a summation of the entry value with one or more other entry values.

23. An electronic device, comprising:
a communication interface;
a memory storing at least a portion of a neural network; and
at least one processor coupled to the communication interface and the memory, the at least one processor configured to:
receive an input from a vector of inputs;
determine a table index based on a value of the input; and
retrieve a hash table from a plurality of hash tables, wherein the hash table corresponds to the table index, wherein the hash table is created using a product of multiplication of the value of the input and values of a compressed weighting matrix codebook, and wherein the neural network is trained using an original weighting matrix that is compressed into the compressed weighting matrix codebook.

24. The electronic device of claim 23, wherein the at least one processor is further configured to:
determine an entry index of the hash table based on an index matrix, wherein the index matrix includes one or more index values, and each of the one or more index values corresponds to a vector in the hash table; and
determine an entry value in the hash table corresponding to the entry index.

25. The electronic device of claim 24, wherein the at least one processor is further configured to:
determine a value index based on dimensions of the hash table in order to determine the entry value, wherein the vector in the hash table includes one or more entry values, and wherein the value index corresponds to one of the one or more entry values in the vector in the hash table.

26. The electronic device of claim 24, wherein the at least one processor is further configured to:
determine a layer response by performing a summation of the entry value with one or more other entry values.

27. A non-transitory computer readable medium embodying a computer program, the computer program comprising computer readable program code that, when executed by at least one processor of an electronic device having a memory storing at least a portion of a neural network, causes the at least one processor to:
receive an input from a vector of inputs;
determine a table index based on a value of the input; and
retrieve a hash table from a plurality of hash tables, wherein the hash table corresponds to the table index, wherein the hash table is created using a product of multiplication of the value of the input and values of a compressed weighting matrix codebook, and wherein the neural network is trained using an original weighting matrix that is compressed into the compressed weighting matrix codebook.

28. The non-transitory computer readable medium of claim 27, further comprising computer readable program code that, when executed by the at least one processor, causes the at least one processor to:
determine an entry index of the hash table based on an index matrix, wherein the index matrix includes one or more index values, and each of the one or more index values corresponds to a vector in the hash table; and
determine an entry value in the hash table corresponding to the entry index.

29. The non-transitory computer readable medium of claim 28, further comprising computer readable program code that, when executed by the at least one processor, causes the at least one processor to:
determine a value index based on dimensions of the hash table in order to determine the entry value, wherein the vector in the hash table includes one or more entry values, and wherein the value index corresponds to one of the one or more entry values in the vector in the hash table.

30. The non-transitory computer readable medium of claim 28, further comprising computer readable program code that, when executed by the at least one processor, causes the at least one processor to:
determine a layer response by performing a summation of the entry value with one or more other entry values.

* * * * *